UNITED STATES PATENT OFFICE.

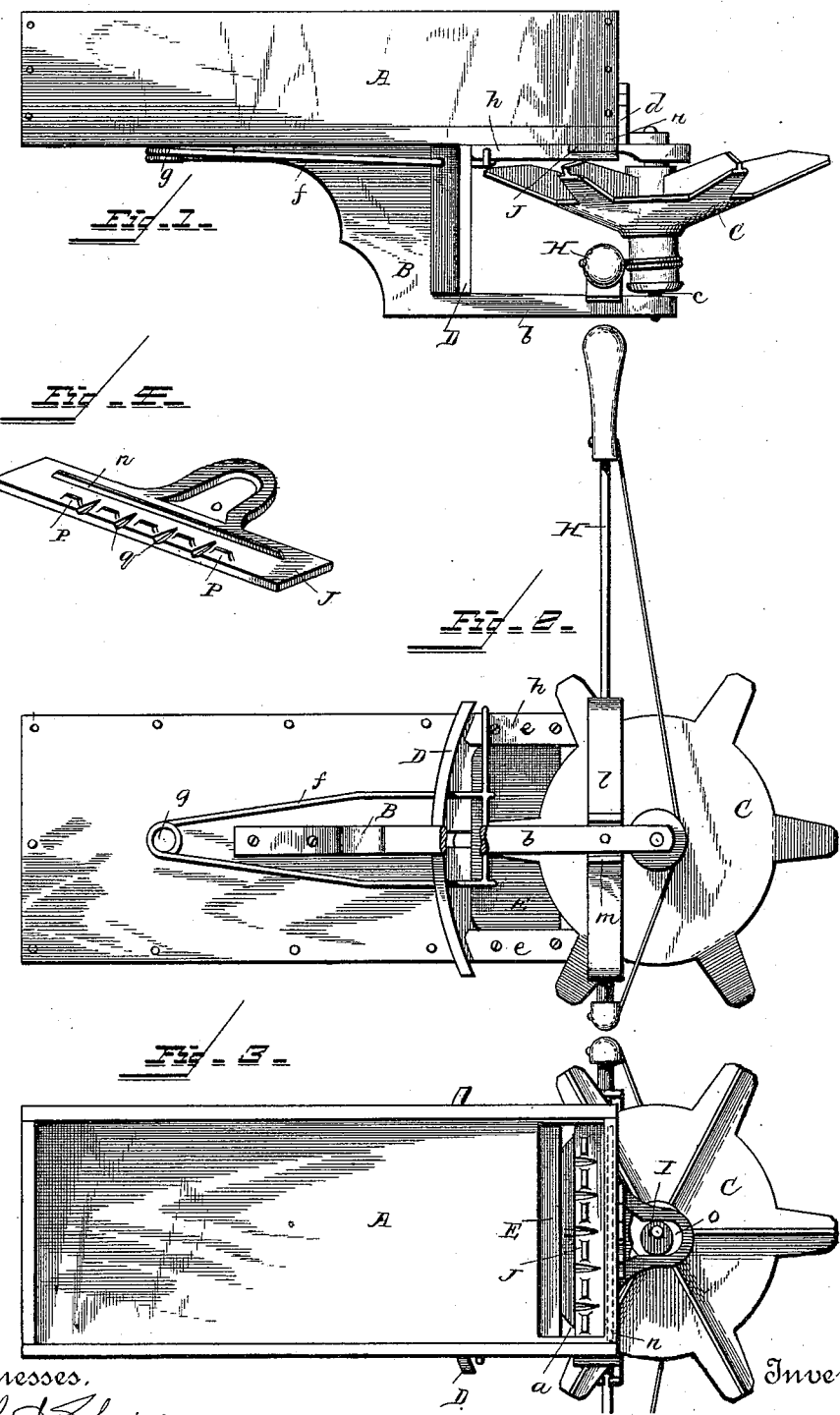

FRANKLIN P. SPANGLER, OF GOSHEN, INDIANA.

BROADCAST SEEDER.

SPECIFICATION forming part of Letters Patent No. 402,993, dated May 7, 1889.

Application filed August 15, 1888. Serial No. 282,813. (No model.)

*To all whom it may concern:*

Be it known that I, FRANKLIN P. SPANGLER, a citizen of the United States, residing at Goshen, in the county of Elkhart and State of Indiana, have invented certain new and useful Improvements in Broadcast Seeders; and I do hereby declare that the following is a full, clear, and exact description of the same, reference being had to the annexed drawings, making a part of this specification, and to the letters and figures of reference marked thereon.

This invention relates to certain new and useful improvements in hand broadcast seeders, and the novelty resides in the peculiar combinations and the construction, arrangement, and adaptation of parts, all as more fully hereinafter described, shown in the drawings, and then particularly pointed out in the appended claims.

The invention is clearly illustrated in the accompanying drawings, which, with the letters of reference marked thereon, form a part of this specification, and in which—

Figure 1 is a side elevation of my improved seeder. Fig. 2 is a bottom plan. Fig. 3 is a top plan. Fig. 4 is a perspective view of the front throat-plate detached.

Referring now to the details of the drawings by letter, A designates the main frame or box, provided in its bottom at the front end with a transverse slot, a, to provide for the passage of the seed to the rotary distributing-wheel below. Secured to the under side of the box A is a bracket, B, the horizontal lower portion, b, of which extends slightly beyond the end of the box and forms a bearing or journal for the lower end of the stem c of the rotary distributing-wheel C. The upper end of this wheel-stem is journaled in a suitable lug or bracket, d, secured to the front end of the box, as seen best in Fig. 1.

Secured to the bracket B is a curved guard, D, extending transversely under the box in rear of the distributing-wheel, its ends extending somewhat laterally, as shown in the drawings. This serves to prevent the seed from being thrown backward under the box. Guides e are secured to the under side of the box, upon each side of the slot a therein, as shown in Fig. 2, and in these guides works the adjustable throat-plate E, which is operated as follows:

f is a piece of stout wire bent upon itself near the center of its length and formed with a coil, g, the ends of the wire being bent at right angles to its length and engaged with the throat-plate, previously being passed through suitable guide-holes in the guard D, as shown in Fig. 1. The arms of the wire forward of the guard are connected by the transverse bar h, one end of which is bent at right angles to its length, as shown, and engaging the side of one of the guides e, and serving to insure a movement of the throat-plate in a straight line. This plate is adjusted, by means of the handle formed by the coil, to regulate the feed from the box, as will be readily understood.

The distributing-wheel C is similar to wheels usually employed in devices of this character, being cone-shaped in its central base portion, from which extend radial arms, the lower portion being spool-like and extended below the bottom to engage the operating-cord. The means for operating the cord are also similar to those heretofore employed, except that I pivot the support l of the reciprocating rod H, which arrangement I have found from experience to add greatly to the efficiency of the device in operation, for where the support is rigid it is soon broken and considerable delay is caused while the same is being repaired. This support l is cast with downwardly-depending lugs m, which extend one on each side of the portion b of the bracket B and serve to limit its motion.

The upper end of the stem of the distributing-wheel is provided with a cam-sleeve, I, which works in the slot o of the front throat-plate, J, which works in guides formed in the front ends of the guides e, so that in the rotation of the distributing-wheel the front throat-plate will at the same time and by the same motion be reciprocated transversely. This front throat-plate is constructed as shown best in Fig. 4. It has a transverse ridge, n, which serves to hold it in position and keeps it from leaking. It is also provided with the ridges p, between which are the corrugations q, which serve to readily carry the seed from the bar and drop it onto the distributing-wheel, and to keep it clear of seed, dirt, &c.

The distributing-wheel is brought close up to the feed-bar, so as to allow the seed to drop at or near the center of the distributing-wheel, so that it will be evenly distributed.

What I claim as new is—

1. In a hand-seeder, the combination, with the box having transverse feed-slot and the guides secured to the under side of said box, of the adjustable throat-plate working in said guides, the wire attached to said throat-plate, and the transverse bar connecting the arms of said wire and provided with a right-angled portion engaging the side of one of said guides, substantially as and for the purpose specified.

2. The combination, with the box having transverse feed-slot, of the front throat-plate beneath said slot and formed with a transverse ridge, $n$, substantially as and for the purpose specified.

3. The combination, with the box having feed-slot, of the front throat-plate formed with transverse ridge $n$, ridges $p$, and corrugations $q$ between said ridges, substantially as and for the purpose specified.

In testimony that I claim the above I have hereunto subscribed my name in the presence of two witnesses.

FRANKLIN P. SPANGLER.

Witnesses:
SAMUEL C. SEEF,
R. W. S. UNGER.